(12) United States Patent
Hu et al.

(10) Patent No.: US 11,067,768 B2
(45) Date of Patent: Jul. 20, 2021

(54) OPTICAL MEMBER DRIVING MECHANISM

(71) Applicant: TDK TAIWAN CORP., Taoyuan (TW)

(72) Inventors: Chao-Chang Hu, Taoyuan (TW);
Shao-Kuang Huang, Taoyuan (TW);
Chih-Wei Weng, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 148 days.

(21) Appl. No.: 16/193,490

(22) Filed: Nov. 16, 2018

(65) Prior Publication Data

US 2019/0146178 A1 May 16, 2019

Related U.S. Application Data

(60) Provisional application No. 62/587,072, filed on Nov. 16, 2017.

(30) Foreign Application Priority Data

Oct. 22, 2018 (CN) .......................... 201811228776.3

(51) Int. Cl.
*G02B 7/04* (2021.01)

(52) U.S. Cl.
CPC ..................................... *G02B 7/04* (2013.01)

(58) Field of Classification Search
CPC . G02B 7/04; G02B 7/08; G02B 7/102; G02B 7/10; G02B 7/023; G02B 7/09; G02B 7/02; G02B 27/646; G02B 7/021; G02B 7/025; G02B 13/001; G02B 7/003; G02B 7/026; G02B 15/14; G02B 7/005; G02B 7/022; G02B 5/005; G02B 7/105; G02B 7/12; G02B 7/14; G03B 3/10; G03B 17/04; G03B 2205/0053; G03B 17/12; G03B 13/36; G03B 17/14; G03B 5/00; G03B 2205/00; G03B 17/02; G03B 2205/0007; G03B 2205/0046; G03B 17/00; G03B 13/34; G03B 17/565; G03B 2217/002;

(Continued)

(56) References Cited

U.S. PATENT DOCUMENTS

2007/0097532 A1* 5/2007 Kuo ......................... H02K 3/50
359/823
2008/0316623 A1* 12/2008 Aoki ................... H04N 5/2251
359/823

(Continued)

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

An optical member driving mechanism is provided, including a first module, a second module, a driving module, and an electronic member module. The driving module can drive the second module to move relative to the first module. The electronic member module includes at least one electronic member, at least one lead frame, and a package member. The lead frame is connected to the electronic member and an external circuit outside the optical member driving mechanism. The package member has a single material and covers the electronic member and the lead frame. The lead frame is exposed from the package member, and the electronic member is not exposed therefrom.

15 Claims, 7 Drawing Sheets

(58) Field of Classification Search
CPC .. G03B 9/06; G03B 13/32; G03B 2205/0023; G03B 2205/0069; G03B 2205/0084; H04N 5/2254; H04N 5/23212; H04N 5/2257; H04N 5/23296; H04N 5/2252; H04N 5/23209; H04N 5/238; H04N 13/239; H04N 13/296; H04N 5/08; H04N 5/2253; H04N 5/2258; H04N 5/23203; H04N 5/23216; H04N 5/23222; H04N 5/23238; H04N 5/23241; H04N 5/23245; H04N 5/23287; H04N 5/2351

See application file for complete search history.

(56) References Cited

U.S. PATENT DOCUMENTS

| | | | | |
|---|---|---|---|---|
| 2012/0120513 | A1* | 5/2012 | Kotanagi | F03G 7/065 |
| | | | | 359/824 |
| 2016/0178922 | A1* | 6/2016 | Hu | G02B 27/646 |
| | | | | 359/557 |
| 2016/0344919 | A1* | 11/2016 | Cho | H04N 5/2254 |
| 2017/0168259 | A1* | 6/2017 | Hu | G02B 7/102 |
| 2017/0235093 | A1* | 8/2017 | Sekiguchi | G02B 7/09 |
| | | | | 359/824 |
| 2017/0272855 | A1* | 9/2017 | Bauer | H01L 24/97 |
| 2017/0329111 | A1* | 11/2017 | Hu | H04N 5/23296 |

\* cited by examiner

OPTICAL MEMBER DRIVING MECHANISM

CROSS REFERENCE TO RELATED APPLICATIONS

This application claims the benefit of U.S. Provisional Application No. 62/587,072, filed Nov. 16, 2017, and China Patent Application No. 201811228776.3, filed Oct. 22, 2018, the entirety of which are incorporated by reference herein.

BACKGROUND OF THE INVENTION

Field of the Invention

The application relates in general to an optical member driving mechanism, and in particular, to an optical member driving mechanism having an electronic member module.

Description of the Related Art

Thanks to technological advancements, the most recent consumer electronic devices (such as tablet computers and smartphones) now usually include a lens module capable of aiding in photography or recording video. These electronic devices have become commonplace, and have been developed to be more convenient and thin. More and more choices are available for users to choose from.

The electronic devices having a lens module usually include many tiny components and wires. Since these electronic devices have been developed to be miniaturized, the aforementioned components and wires are hard to assemble, and they may become detached or broken if the electronic device is shaken or struck. Therefore, how to address the aforementioned problem has become an important issue.

BRIEF SUMMARY OF INVENTION

To address the deficiencies of conventional products, an embodiment of the invention provides an optical member driving mechanism, including a first module, a second module, a driving module, and an electronic member module. The driving module can drive the second module to move relative to the first module. The electronic member module includes at least one electronic member, at least one lead frame, and a package member. The lead frame is connected to the electronic member and an external circuit outside the optical member driving mechanism. The package member has a single material and covers the electronic member and the lead frame. The lead frame is exposed from the package member, and the electronic member is not exposed therefrom.

In some embodiments, the lead frame has a section adjacent to the electronic member, and at least a portion of the lead frame and the electronic member are overlapped as observed from the longitudinal axis of the section. The electronic member module further comprises a wire, connected to the lead frame and the electronic member and extended away from the lead frame. The package member contacts the wire, the lead frame, and the electronic member.

In some embodiments, the electronic member module further comprises another electronic member, and the lead frame has a first end adjacent to the electronic member and a second end adjacent to the other electronic member. The distance between the first end and the electronic member is different from the distance between the second end and the other electronic member.

In some embodiments, the electronic member is a sensor, a filter, or a driver IC. The package member comprises resin, plastic, or glass. In some embodiments, the electronic member module further comprises a magnetic permeability member adjacent to the electronic member, and the magnetic permeability member and the lead frame are electrically independent.

In some embodiments, the first module is a fixed portion. The fixed portion comprises a frame, and the package member and the frame are integrally formed as one piece. The second module comprises a magnetic member, and the lead frame is disposed between the magnetic member and the electronic member.

In some embodiments, the electronic member and the lead frame are embedded in the package member by SESUB. The optical member driving mechanism further comprises another electronic member, disposed on an outer surface of the electronic member module. In some embodiments, the first module is a movable portion.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
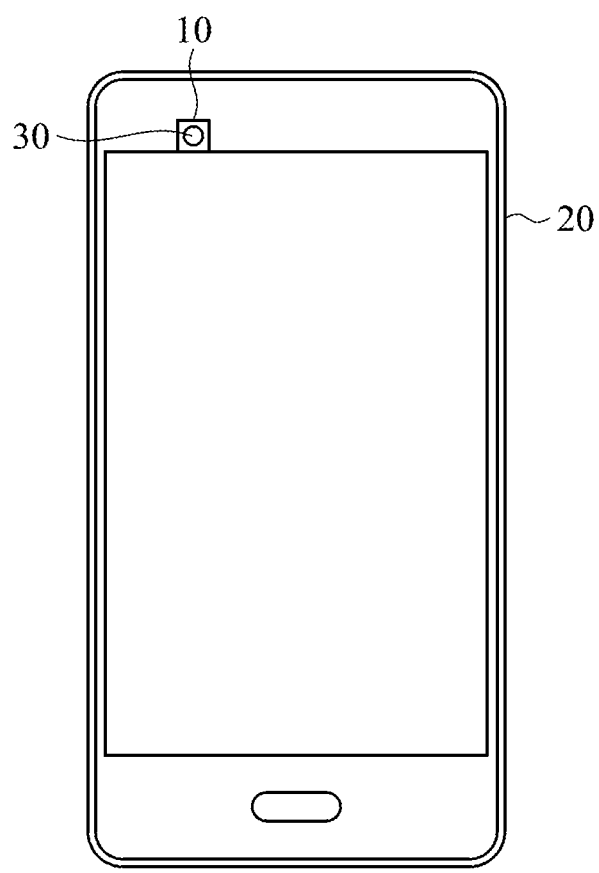
FIG. 1 is a schematic diagram of an electronic device according to an embodiment of the invention.

Referring to FIG. 1, in an embodiment of the invention, the optical member driving mechanism 10 can be disposed in an electronic device 20 and used to hold and drive an optical member 30. Therefore, the optical member 30 can move relative to an image sensor (not shown) in the electronic device 20, so as to achieve the purpose of focus adjustment. For example, the electronic device 20 can be a digital camera or a smart phone having the function of capturing photographs or making video recordings, and the optical member 30 can be a camera lens.

Figure 2:
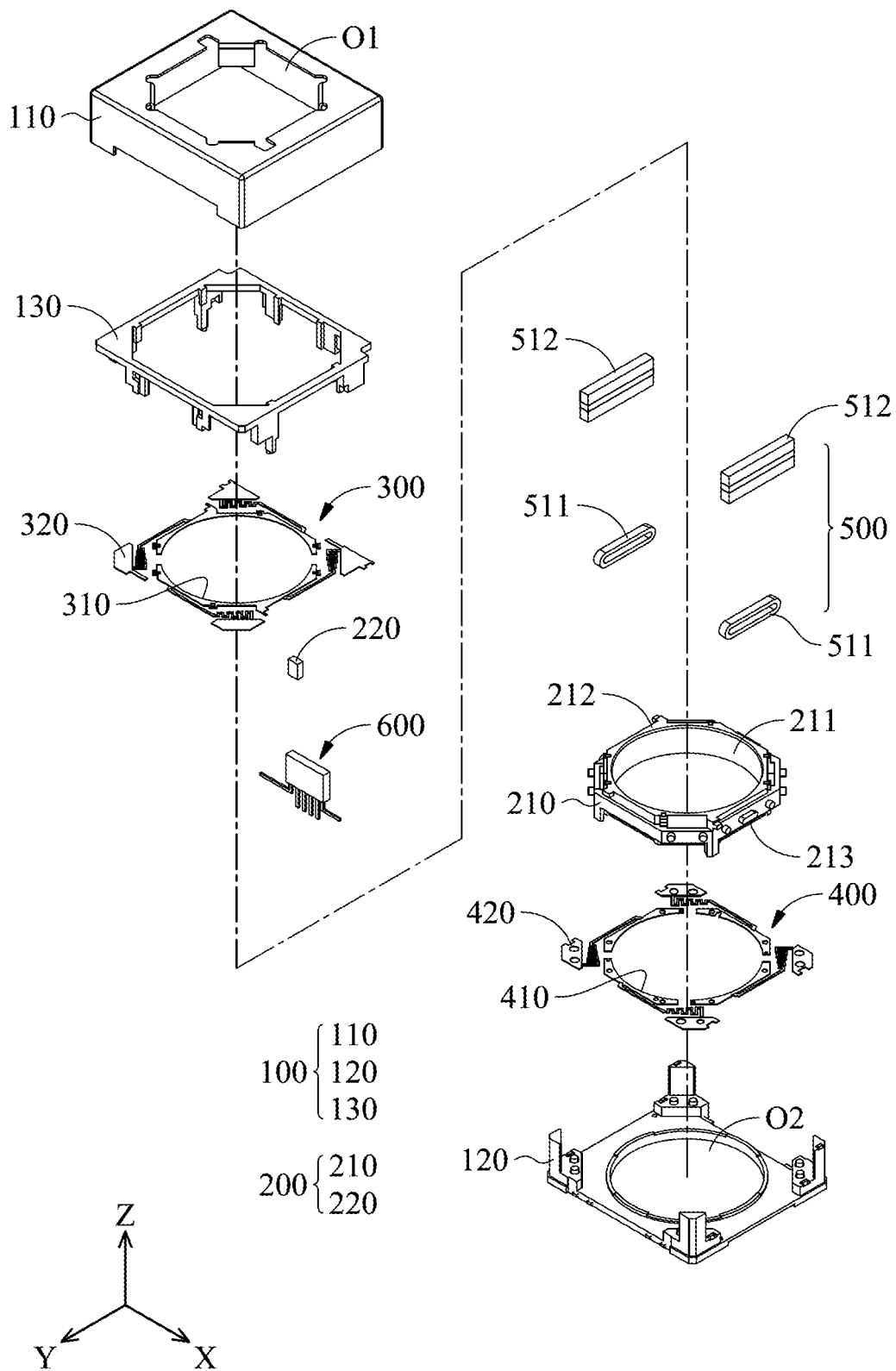
FIG. 2 is an exploded-view diagram of an optical member driving mechanism according to an embodiment of the invention.

FIG. 2 is an exploded-view diagram of the optical member driving mechanism 10. As shown in FIG. 2, the optical member driving mechanism 10 primarily comprises a first module 100, a second module 200, a first elastic member 300, a second elastic member 400, a driving module 500, and an electronic member module 600.

In this embodiment, the first portion 100 is a fixed portion, comprising a housing 110, a bottom 120, and a frame 130. The frame 130 is affixed to the housing 110, and the housing 110 and the bottom 120 can be assembled to form a hollow box. The second module 200, the first elastic member 300, the second elastic member 400, the driving module 500, and the electronic member module 600 are surrounded by the housing 110 and accommodated in the hollow box.

The movable portion 200 is a movable portion. For example, the movable portion 200 can comprise an optical member holder 210, and a through hole 211 can be formed at the center thereof. The optical member 30 can be disposed in the through hole 211. The housing 110 and the bottom 120 respectively has an optical hole O1 and an optical hole O2 corresponding to the through hole 211. Thus, an external light can pass through the optical hole O1, the optical member 30, and the optical hole O2 in sequence and reach the image sensor in the electronic device 20, so as to form an image on the image sensor.

The first elastic member 300 and the second elastic member 400 are respectively disposed on the opposite sides of the optical member holder 210. An inner section 310 and an outer section 320 of the first elastic member 300 are respectively connected to the upper surface 212 of the optical member holder 210 and the frame 130, and an inner section 410 and an outer section 420 of the second elastic member 400 are respectively connected to the lower surface 213 of the optical member holder 210 and the bottom 120. Therefore, the optical member holder 210 can be hung in the hollow box by the first elastic member 400 and the second elastic member 500.

Referring to FIG. 2, the driving module 500 comprises at least one first electromagnetic driving member 511 and at least one second electromagnetic driving member 512. The first electromagnetic driving member 511 is disposed on the optical member holder 210, and the second electromagnetic driving member 512 is disposed on the bottom 120 or the frame 130 of the first module 100. The electromagnetic effect between the first electromagnetic driving member 511 and the second electromagnetic driving member 512 can drive the optical member holder 210 and the optical member 30 disposed thereon to move along the Z-axis relative to the first module 100.

For example, in this embodiment, the first electromagnetic driving member 511 can be a driving coil, and the second electromagnetic driving member 512 can be a magnetic member (such as a magnet). When a current flows through the driving coil (the first electromagnetic driving member 511), an electromagnetic effect is generated between the driving coil and the magnet, and provides an electromagnetic force along the Z-axis on the optical member holder 210. Therefore, the optical member holder 210 and the optical member 30 disposed thereon can move along the Z-axis relative to the first module 100, and move further along the Z-axis relative to the image sensor in the electronic device 20. The purpose of focus adjustment can be achieved.

In this embodiment, the driving module 500 comprises two first electromagnetic driving members 511 disposed on the opposite sides of the optical member holder 210 and two second electromagnetic driving members 512 disposed on the opposite sides of the optical member holder 210. Therefore, a uniform driving force can be provided to move the optical member holder 210, and the rotation of the optical member holder 210 relative to the first module 100 can be prevented. In some embodiments, the driving module 500 comprises one first electromagnetic driving member 511 surrounding the optical member holder 210 and two electromagnetic driving members 512 disposed on the opposite sides of the optical member holder 210 (or four electromagnetic driving members 512 respectively disposed on the four sides of the optical member holder 210). In some embodiments, the driving module 500 can comprise a single first electromagnetic driving member 511 and a single electromagnetic driving member 512 if the first electromagnetic driving member 511 and the electromagnetic driving members 512 can provide sufficient driving force.

In some embodiments, the first electromagnetic driving member 511 can be a magnetic member, and second the electromagnetic member 512 can be a driving coil.

Figure 3:
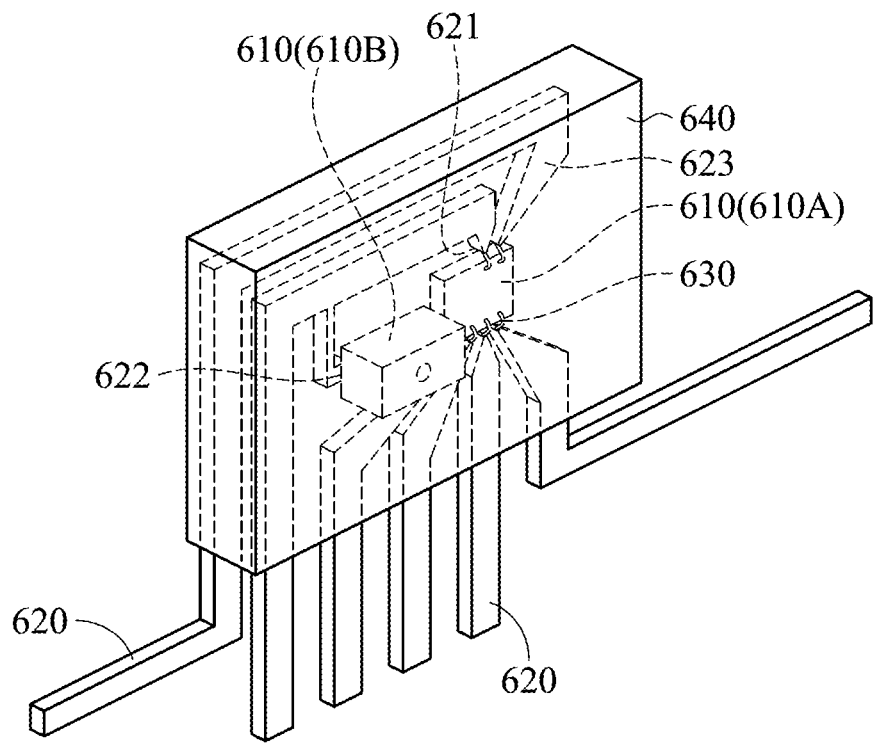
FIG. 3 is a schematic diagram of an electronic member module according to an embodiment of the invention.

FIG. 3 is a schematic diagram of the electronic member module 600. As shown in FIGS. 2 and 3, the electronic member module 600 can be affixed to the first module 100 and comprise at least one electronic member 610, at least one lead frame 620, at least one wire 630, and a package member 640.

The package member 640 completely covers the electronic member 610 and the wire 630, and partially covers the lead frame 620. In other words, a portion of the lead frame 620 is exposed from the package member 640, and the electronic member 610 and the wire 630 are not exposed therefrom.

The lead frame 620 is electrically connected to the electronic member 610, so as to connect the electronic member 610 to an external circuit (not shown) in the electronic device 20. In particular, an end of the lead frame 620 covered by the package member 640 is connected to the electronic member 610, and another end of the lead frame 620 which is not covered by the package member 640 is connected to the external circuit.

In this embodiment, the electronic member module 600 comprises two electronic members 610A and 610B. The electronic member 610A is connected to the lead frame 620 via the wire 630, and the electronic member 610B directly contacts the lead frame 620. Therefore, as shown in FIG. 3, the first end 621 and the second end 622 of the lead frame are 620 respectively adjacent to the electronic member 610A and the electronic member 610B, and the distance between the electronic member 610A and the first end 621 is different from the distance between the electronic member 610B and the second end 622.

It should be noted that, the lead frame 620 has a section 623 adjacent to the electronic member 610. The electronic member 610 can directly contact this section 623, or the wire 630 can be connected to this section 623 and extended away from the lead frame 620 to connect the electronic member 610. At least a portion of the lead frame 620 and the electronic member 610 are overlapped as observed from the longitudinal axis of the section 623.

The electronic member 610 can comprise a sensor, a filter, or a driver IC. The sensor can be a Hall effect sensor, a magnetoresistance effect sensor (MR sensor), a giant magnetoresistance effect sensor (GMR sensor), a tunneling magnetoresistance effect sensor (TMR sensor), or a fluxgate sensor, and can be used to detect the movement of the second module 200.

For example, as shown in FIG. 2, the second module 200 can comprise a magnetic member 220 (such as a magnet) disposed on the optical member holder 210 and adjacent to the electronic member 610, which is a sensor. When the driving module 500 drives the second module 200 to move relative to the first module, the sensor can obtain the position of the magnetic member 220 and the second module 200 by the variation of the magnetic field.

Since the package member 640 is made by a single material (for example, the resin, the plastic, or the glass), and the electronic member 610, the lead frame 620 and the wire 630 are embedded in the package member 640, the assembled strength of the components can be enhanced, and the miniaturization of the optical member driving mechanism 10 can be facilitated. Furthermore, the inclined or the detachment of the lead frame 620 due to the heat when the lead frame 620 is connected to the external circuit by welding can be also prevented.

In some embodiments, the lead frame 620 can comprise magnetic permeability material, and the sensor can detect the position of the magnetic member 220 and the second module 200 more accurately. In some embodiments, a magnetic permeability member can be disposed adjacent to the electronic member 610, wherein the magnetic permeability member is electrically independent from the lead frame 620 and covered by the package member 640.

Figure 4:
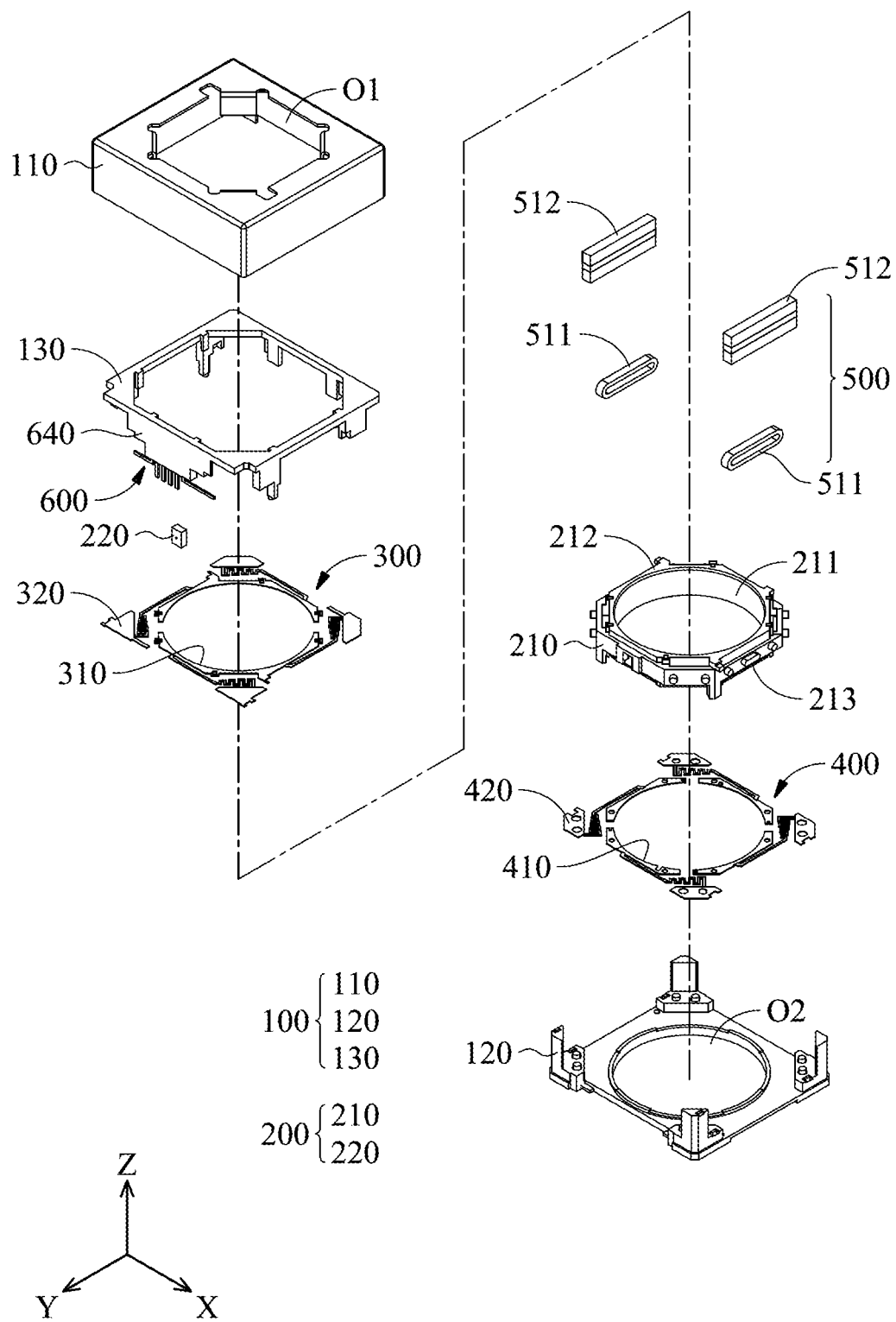
FIG. 4 is an exploded-view diagram of an optical member driving mechanism according to another embodiment of the invention.

Referring to FIG. 4, in another embodiment of the invention, the frame 130 of the first module 100 can comprise resin, plastic or glass, and the electronic member 610, the lead frame 620 and the wire 630 can be directly embedded in the frame 130 of the first module 100. That is, the frame 130 and the package member 640 can be integrally formed as one piece, and the frame 130 can be used as the package member 640 of the electronic member module 600.

Figure 5A:
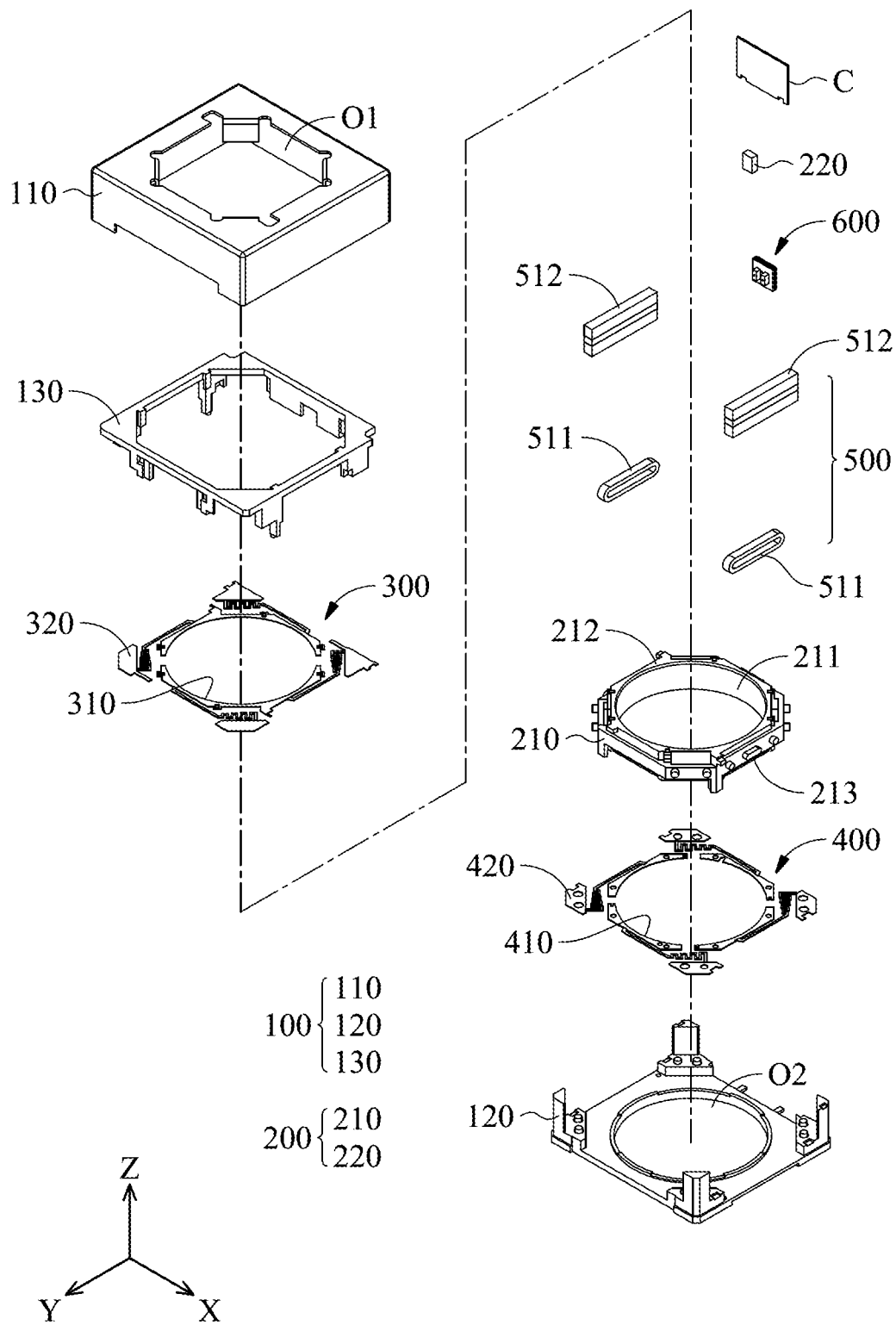
FIG. 5A is an exploded-view diagram of an optical member driving mechanism according to another embodiment of the invention.
Figure 5B:
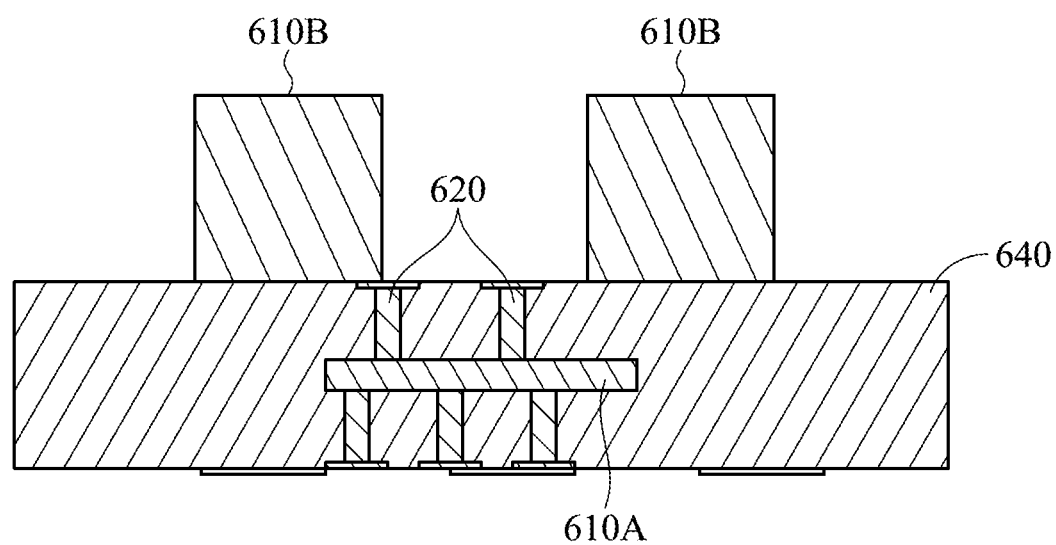
FIG. 5B is a cross-sectional view of the electronic member module according to another embodiment of the invention.

Referring to FIGS. 5A and 5B, in another embodiment of the invention, the electronic member 610A, which is a driver IC, and the lead frame 620 can be embedded into the package member 640 by SESUB (Semiconductor Embedded in Substrate) to further miniaturize the optical member driving mechanism 10. Other electronic members 610B can be disposed on the outer surface 601 of the electronic member module 600 and connected to the lead frame 620. Moreover, the electronic member module 600 can be electrically connected to the circuit board C on the housing 110.

Figure 6:
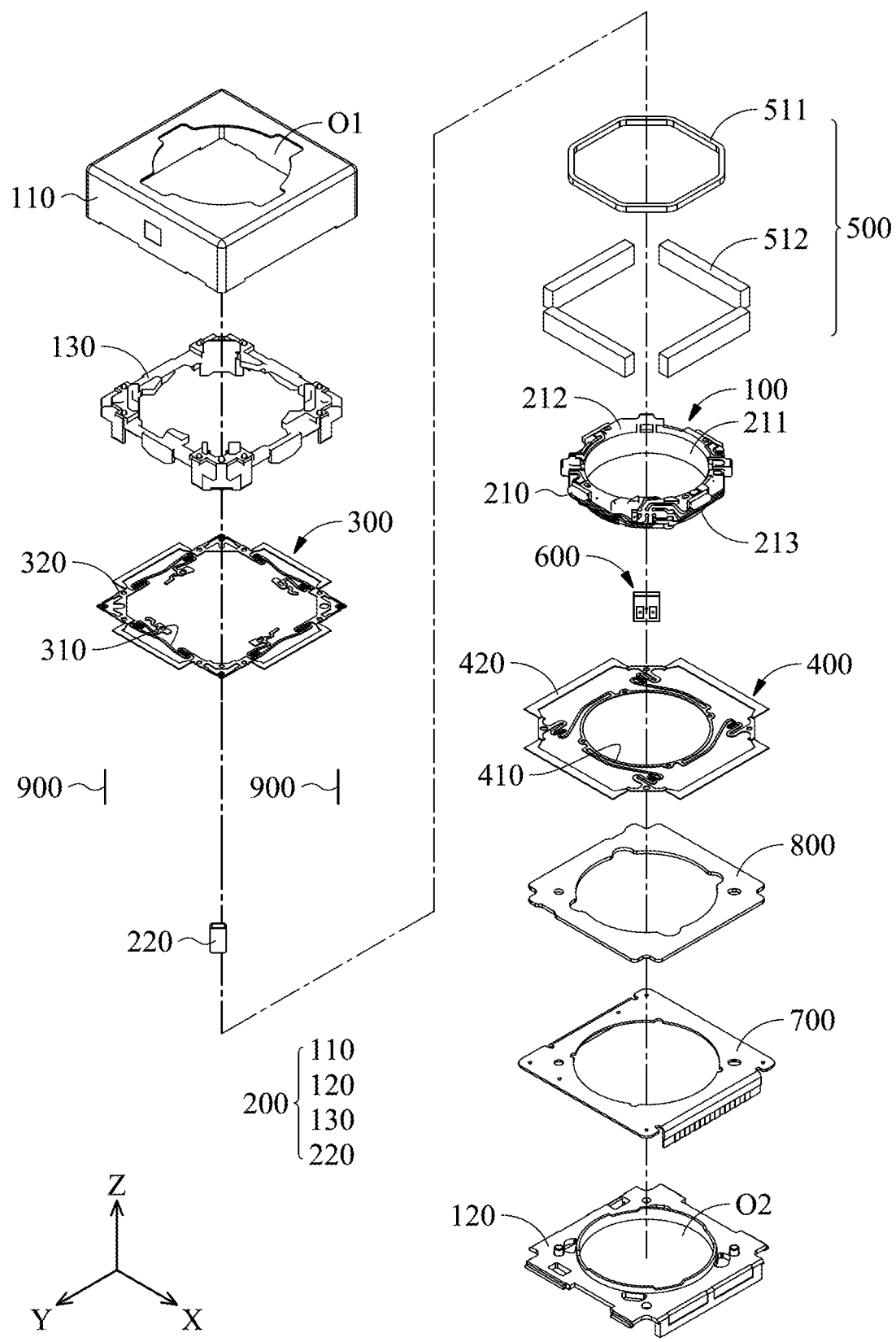
FIG. 6 is an exploded-view diagram of an optical member driving mechanism according to another embodiment of the invention.

Referring to FIG. 6, in another embodiment of the invention, the first module 100 is a movable portion comprising an optical member holder 210, and the second module 200 is a fixed portion comprising a housing 110, a bottom 120, a frame 130, and a magnetic member 220. The electronic member module 600 is disposed on the first module 100, which is the movable portion. Since the structures of the housing 110, the bottom 120, the frame 130, the optical member holder 210, the magnetic member 220, and the electronic member holder 600 are the same as that in the aforementioned embodiment, the features thereof are not repeated in the interest of brevity.

In this embodiment, the optical member driving mechanism 10 further comprises a circuit board 700, a coil plate 800, and a plurality of suspension wires 900. The circuit board 700 is disposed on the bottom 120, the coil plate 800 is disposed on the circuit board 700, and the suspension wires connect the circuit board 700 to the first elastic member 300. When a current flows through the coil plate 800, an electromagnetic effect is generated between the coil plate 800 and the second electromagnetic driving member 512, and provides an electromagnetic force to move the optical member holder 210 along the X-axis and/or the Y-axis. The purpose of image stabilization can be achieved.

In summary, an optical member driving mechanism is provided, including a first module, a second module, a driving module, and an electronic member module. The driving module can drive the second module to move relative to the first module. The electronic member module includes at least one electronic member, at least one lead frame, and a package member. The lead frame is connected to the electronic member and an external circuit outside the optical member driving mechanism. The package member has a single material and covers the electronic member and the lead frame. The lead frame is exposed from the package member, and the electronic member is not exposed therefrom.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
a first module;
a second module;
a driving module, driving the second module to move relative to the first module; and
an electronic member module, disposed on the first module, comprising:
a package member;
a first electronic member, having a plurality of surfaces, wherein the surfaces of the first electronic member are not parallel to each other, the package member is directly in contact with the surfaces of the first electronic member, and the first electronic member is not exposed from the package member, wherein the first electronic member is configured to control the driving module or detect the relative motion between the second module and the first module;
a second electronic member, fixedly disposed in the package member, wherein a gap between the first electronic member and the second electronic member is greater than zero;
a first frame, electrically connected to the first electronic member and comprising:
  a first segment, electrically connected to the first electronic member and having a plurality of surfaces, wherein the surfaces of the first segment are not parallel to each other, the package member is directly in contact with the surfaces of the first segment, and the first segment is not exposed from the package member; and
  a second segment, electrically connected to the first electronic member via the first segment, wherein the first segment and the second segment are integrally formed as one piece, the second segment is connected to the first segment without adhering and welding, and at least a portion of the second segment is exposed from the package member; and
a second frame, electrically connected to the second electronic member and comprising:
  a third segment, electrically connected to the second electronic member and having a plurality of surfaces, wherein the surfaces of the third segment are not parallel to each other, the package member is directly in contact with the surfaces of the third segment, and the third segment is not exposed from the package member; and
  a fourth segment, electrically connected to the second electronic member via the third segment, wherein the third segment and the fourth segment are integrally formed as one piece, the fourth segment is connected to the third segment without adhering and welding, and at least a portion of the fourth segment is exposed from the package member.

2. The optical member driving mechanism as claimed in claim 1, wherein the lead frame has a section adjacent to the electronic member, and at least a portion of the lead frame and the electronic member are overlapped as observed from the longitudinal axis of the section.

3. The optical member driving mechanism as claimed in claim 1, wherein the electronic member module further comprises a wire connected to the lead frame and the electronic member, and the package member contacts the wire, the lead frame, and the electronic member.

4. The optical member driving mechanism as claimed in claim 3, wherein the wire is extended away from the lead frame.

5. The optical member driving mechanism as claimed in claim 1, wherein the electronic member module further comprises another electronic member, and the lead frame has a first end adjacent to the electronic member and a second end adjacent to the other electronic member, wherein the distance between the first end and the electronic member is different from the distance between the second end and the other electronic member.

6. The optical member driving mechanism as claimed in claim 1, wherein the electronic member is a sensor, a filter, or a driver IC.

7. The optical member driving mechanism as claimed in claim 6, wherein the package member comprises resin, plastic, or glass.

8. The optical member driving mechanism as claimed in claim 1, wherein the first module is a fixed portion.

9. The optical member driving mechanism as claimed in claim 8, wherein the fixed portion comprises a frame, and the package member and the frame are integrally formed as one piece.

10. The optical member driving mechanism as claimed in claim 8, wherein the second module comprises a magnetic member, and the lead frame is disposed between the magnetic member and the electronic member.

11. The optical member driving mechanism as claimed in claim 1, wherein the electronic member and the lead frame are embedded in the package member by SESUB.

12. The optical member driving mechanism as claimed in claim 11, wherein the optical member driving mechanism further comprises another electronic member, disposed on an outer surface of the electronic member module.

13. The optical member driving mechanism as claimed in claim 1, wherein the first module is a movable portion.

14. The optical member driving mechanism as claimed in claim 1, wherein the electronic member module further comprises a magnetic permeability member adjacent to the electronic member, and the magnetic permeability member and the lead frame are electrically independent.

15. The optical member driving mechanism as claimed in claim 1, wherein the lead frame comprises magnetic permeability material.

* * * * *